J. JENNE.
Manger.
No. 13,312.
Patented July 24, 1855.
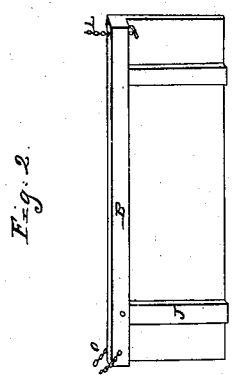
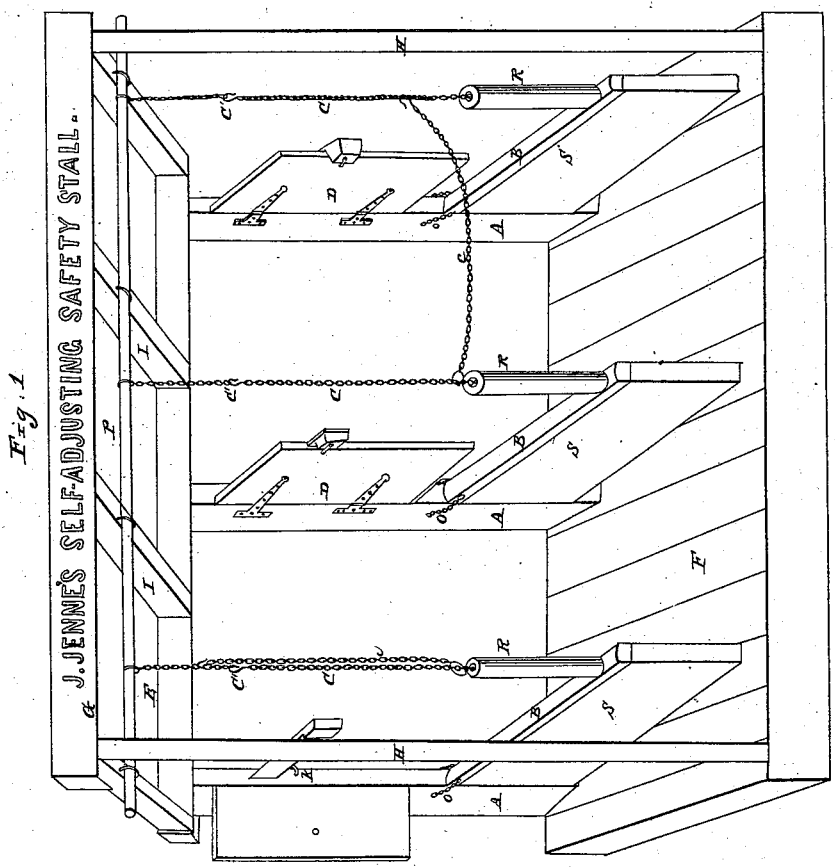

UNITED STATES PATENT OFFICE.

JNO. JENNE, OF BETHANY, NEW YORK.

STALL FOR HORSES, &c.

Specification of Letters Patent No. 13,312, dated July 24, 1855.

*To all whom it may concern:*

Be it known that I, JOHN JENNE, of Bethany, in the county of Genesee and State of New York, have invented certain new and useful Improvements in Stables or Stalls for Horses or other Animals; and I do hereby declare that the same are described and represented in the following specifications and drawings.

To enable others skilled in the art to make and use my improvements I will proceed to describe their construction and use, referring to the drawings in which the same letters indicate like parts in each of the figures.

Figure 1, is a perspective view of my improved stalls. Fig. 2, represents a swinging partition boarded upon one side only.

The nature of my invention and improvements in the construction of stables or stalls for horses or other animals consists in a series of swinging partitions between which the animals are hitched, which partitions are so arranged as to yield readily to the pressure or kick of the animal, so as to prevent him from injuring himself by getting cast, or getting down so as to be unable to rise without assistance; or injuring the animals standing next to him. These partitions are so arranged that they may all be swung around so as to hang parallel with, and side by side of each other, and leave the space open and unobstructed so as to make it available for other purposes when desired, or they may be removed altogether by unhooking the chains or devices used to hang them.

In the accompanying drawing the floor of the stable is represented at F, to which the lower ends of the upright planks A, A, are fastened; these planks should be about 18 inches wide and two and a half inches thick and their upper ends should be firmly fastened to the bar E or the upper frame work of the stable.

The bar G, is supported by the posts H, H, as represented and connected to the bar E, by the bars I, I, so as to form a frame for the stable. I make a series of swinging partitions S S of about the following dimensions, viz.: By taking a square joist B, three and one half by four inches, and six feet six inches long, and frame two arms J J into it as represented in Fig. 2, which arms are one and a half inches thick, four inches wide, and two feet four inches long, and fasten boards to each side of these arms so as to form a partition as represented in Fig. 1.

The bar B, is perforated near one end for the chain o, which passes through it and through a hole in the upright plank A and the ends of the chain are hooked together so as to hold the partition S one foot from the floor F, and allow it to swing or vibrate freely the opposite end of the partition being suspended by the chain C, which is fastened to the bar B, and to the bar P, for that purpose; the bar P being fastened to the under side of the bars I, I, as represented or otherwise. I put a sleeve R upon each of the chains C, C, fitted to turn freely like a roller, when the animal rubs against it, so as to prevent him from being injured by coming in contact with the chain. Whenever it is desirable the chain c, may be hitched across from one suspension chain to the other, so as to confine the rear of the animal.

The hook C′, in the chain C, is arranged so as to be reached conveniently by a person standing on the floor, so as to unhook the chain and swing the partition around and hitch the hook into the staple K, in the plank A, so as to clear the space crossed by the partition S, S, when desired; and by unhooking the chain o the partitions may be removed altogether.

The doors D, D, may be hung to the plank A, as represented, so as to prevent the animals from getting their heads together, when the doors are buttoned to the bar L, which is fastened to the plank A, for that purpose. These doors may be swung around against the plank whenever it is desirable to make the stable more airy or expose the heads of the animals, or unhitch an animal in one stall while standing in the next one to it.

I have not deemed it necessary to represent a manger, rack or other feeding apparatus as those may be adopted to suit the kind of animals to be fed or the peculiar views of the maker.

I contemplate that the swinging partitions may be made of a single thickness of plank with iron bolts put through them edgewise to hold them together and prevent them from being split by any casualty. Also that the other parts may be modified in various ways to suit the views of those who construct and use them.

The following are some of the advantages of my improvements, viz: 1st, there is far less danger of horses lying down and rolling upon their backs or getting cast as it is termed, so that they cannot get up again and bruising or injuring themselves against the sides or floor of the stalls in trying to get up. 2d, the partitions yield readily sidewise, so that there is no danger of a horse getting his hind legs around or by the rear end of the partition so as to embarrass his getting up again. 3d, these stalls are so constructed that a vicious horse may be led into one of them by passing into the next stall and fastening him, or attending to him or take him out when desired without being under the necessity of going into the stall beside him. 4th, the outer ends of the swinging partitions may be brought together and fastened by hitching the chain c, around the suspension chains, so as to confine a horse very closely to correct or tame him, without danger either to the animal or attendant. 5th, by unhitching the suspension chains and swinging the partitions around, a two-horse team may be driven in and fed without unhitching them from the carriage. 6th, if the swinging partitions are used the space allowed to each animal may be made one foot narrower, and thereby save one fourth of the room; as three feet is sufficient for all purposes except cleaning and harnessing when the partition may be hung over against the next one. 7th, the animal cannot rub against the swinging partitions so as to injure himself or harness, and the sleeve on the suspension chain prevents him from injuring his tail against it. 8th, horses that are in the habit of kicking in permanent partitions may be cured by the use of swinging partitions, or at least he is far less liable to injure himself by kicking against them. 9th, the swinging partitions may be all swung around and hung parallel or removed altogether, by unhitching the chains, if the space occupied is wanted for some other purpose. 10th, a stable provided with my improvements is far more airy and healthy, as the partitions do not come to the floor it can be kept clean with far less labor and trouble which is a very important item. 11th, these swinging partitions cost less than the permanent ones as they are usually constructed, and as less room will answer for each animal a stable for a given number might be made one fourth less in size, and the cost proportionally diminished.

I believe I have described the construction, operation and use of my improvements so as to enable any person skilled in the art to make and use the same. I will now specify what I desire to secure by Letters Patent, viz:

What I claim as my invention and improvements in stables or stalls for horses or other animals is—

1. The swinging partitions S, S, constructed and arranged substantially as described for the purposes set forth.

2. I claim the doors D, D, in combination with the planks A, A, so constructed and arranged as to operate substantially as described.

3. I claim the sleeves R, R, in combination with the chains C, C, to prevent the animal from injuring himself by rubbing against the chains.

JOHN JENNE.

Witnesses:
JOHN L. SMITH,
J. DENNIS, Jr.